United States Patent
Nacer et al.

(10) Patent No.: US 9,894,509 B2
(45) Date of Patent: Feb. 13, 2018

(54) PROVIDING MOBILE COMMUNICATION SERVICE USING A DONGLE DEVICE

(71) Applicant: Verizon Patent and Licensing Inc., Arlington, VA (US)

(72) Inventors: Jeremy Nacer, Morris Plains, NJ (US); Musa Kazim Guven, Fort Lee, NJ (US); Danny C. Lui, Belle Mead, NJ (US); Christopher M. Schmidt, Branchburg, NJ (US)

(73) Assignee: Verizon Patent and Licensing Inc., Basking Ridge, NJ (US)

(*) Notice: Subject to any disclaimer, the term of this patent is extended or adjusted under 35 U.S.C. 154(b) by 388 days.

(21) Appl. No.: 14/789,542

(22) Filed: Jul. 1, 2015

(65) Prior Publication Data

US 2017/0006656 A1  Jan. 5, 2017

(51) Int. Cl.
*H04W 8/06* (2009.01)
*H04W 76/02* (2009.01)
*H04W 4/26* (2009.01)
*H04W 8/18* (2009.01)
*H04W 88/06* (2009.01)

(52) U.S. Cl.
CPC ............... *H04W 8/06* (2013.01); *H04W 4/26* (2013.01); *H04W 76/02* (2013.01); *H04W 8/18* (2013.01); *H04W 88/06* (2013.01)

(58) Field of Classification Search
CPC ....... H04W 88/06; H04W 8/18; H04W 48/18; H04W 4/24; H04W 4/26; H04W 76/02; H04W 8/065

USPC .......................................................... 455/41
See application file for complete search history.

(56) References Cited

U.S. PATENT DOCUMENTS

| | | | | |
|---|---|---|---|---|
| 9,246,913 B2* | 1/2016 | Gupta | ................ | H04L 63/0853 |
| 2008/0244148 A1* | 10/2008 | Nix, Jr. | ............... | H04L 41/0856 710/313 |
| 2009/0047016 A1* | 2/2009 | Bernard | .............. | H04L 12/5692 398/43 |
| 2011/0014948 A1* | 1/2011 | Yeh | .................... | G06Q 20/3278 455/558 |
| 2012/0276867 A1* | 11/2012 | McNamee | .......... | H04L 12/1407 455/406 |
| 2016/0381603 A1* | 12/2016 | Vuornos | ............. | H04L 12/1432 455/406 |

* cited by examiner

*Primary Examiner* — Charles Appiah
*Assistant Examiner* — Margaret G Mastrodonato

(57) ABSTRACT

A system may receive, from a dongle device ("dongle"), a connection request to receive mobile communication service ("service") associated with a service campaign ("campaign") for a mobile device: the mobile device being associated with a first service provider ("SP"); the dongle being associated with a second SP and the campaign; the dongle being configured to provide the service from the second SP to the mobile device; and the connection request including a dongle device identifier ("identifier") associated with the dongle. The system may compare the identifier with stored identifiers associated with the campaign. The system may determine that the identifier is associated with the campaign if the identifier matches one of the stored identifiers and may cause a connection to be established to provide the service to the mobile device via the dongle based on the identifier being associated with the campaign.

20 Claims, 12 Drawing Sheets

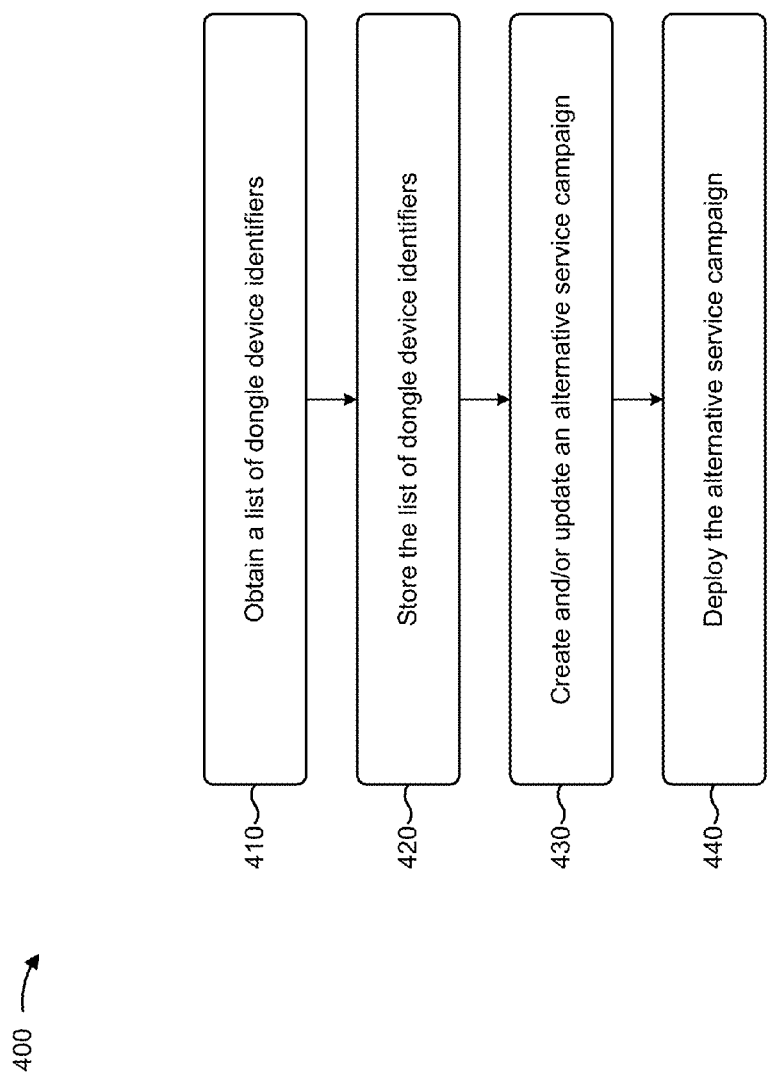

PROVIDING MOBILE COMMUNICATION SERVICE USING A DONGLE DEVICE

BACKGROUND

A dongle is a small piece of hardware that can attach to a computer, a television, or another electronic device, and that, when attached, enables additional functions, such as copy protection, audio, video, games, data, or other services. These services may only be available when the dongle is attached. A dongle may be easily removed and replaced from electronic devices via an interface, such as a universal serial bus (USB) interface, a Lightning connector, a high-definition media interface (HDMI), a wireless interface, or the like.

BRIEF DESCRIPTION OF THE DRAWINGS

FIG. 4 is a flow chart of an example process for deploying an alternative service campaign for providing mobile communication service to a mobile device, associated with an original service provider, using a dongle device;

DETAILED DESCRIPTION OF PREFERRED EMBODIMENTS

The following detailed description of example implementations refers to the accompanying drawings. The same reference numbers in different drawings may identify the same or similar elements.

A user of a mobile device may lose mobile communication service (e.g., ability to send and/or receive voice calls and/or data), provided by an original service provider, in certain situations (e.g., emergency situations, such as Superstorm Sandy, the Colorado wildfires, the tornadoes of 2011, or the like). Another service provider (or an alternative service provider), however, may be able to provide mobile communication service during these situations. The user of the mobile device may desire to use the mobile device to stay in communication and/or make a voice call during the loss of mobile communication service from the original service provider. Implementations described here utilize a dongle device to provide mobile communication service by an alternative service provider to a mobile device associated with an original service provider. The dongle device may assist in providing mobile communication service to the mobile device regardless of whether the original service provider is capable of providing mobile communication service (i.e., using the dongle device to over-ride the mobile communication service provided by the original service provider).

Figure 1A:
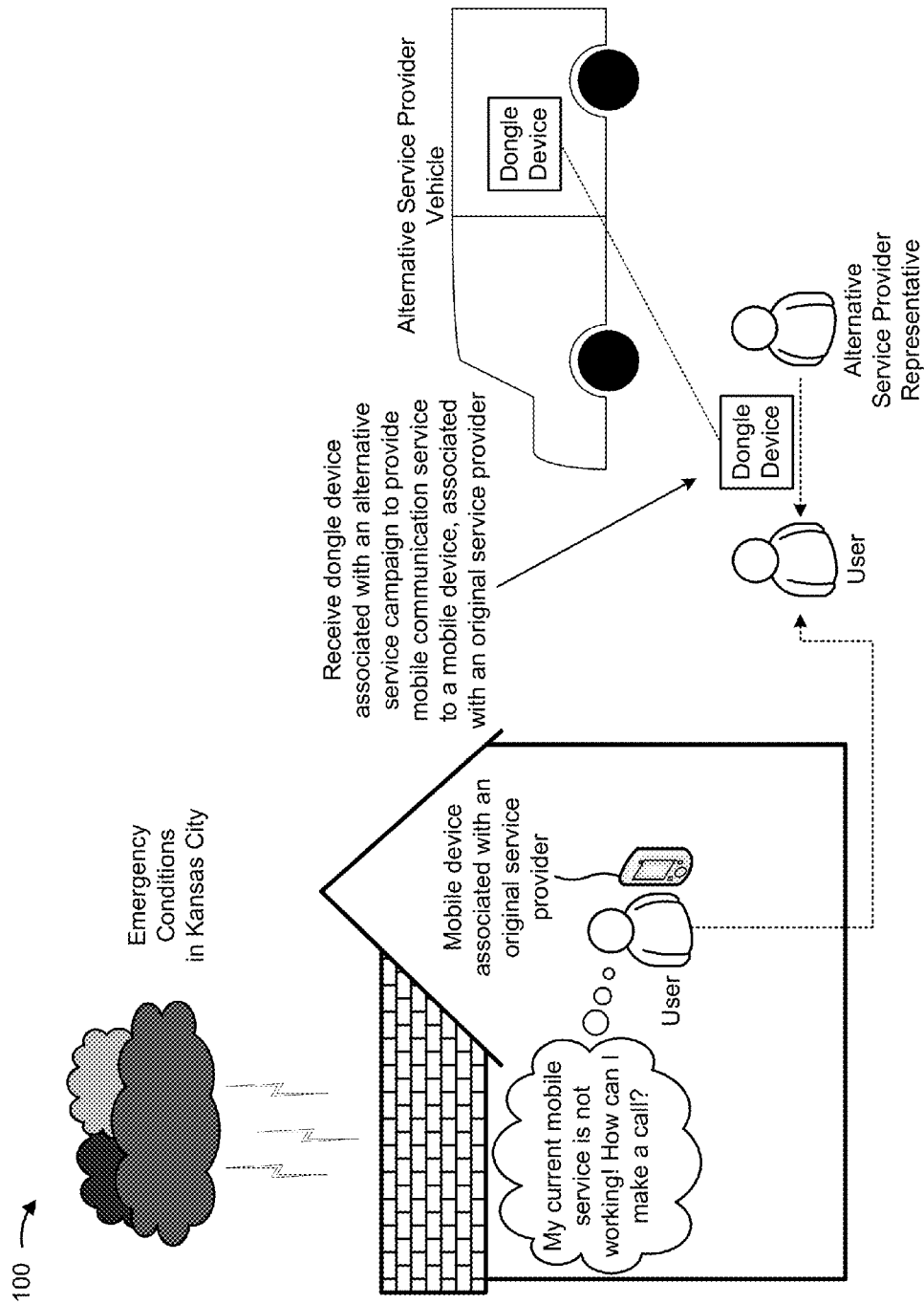
FIG. 1A-1B are diagrams of an overview of an example implementation described herein.
Figure 1B:
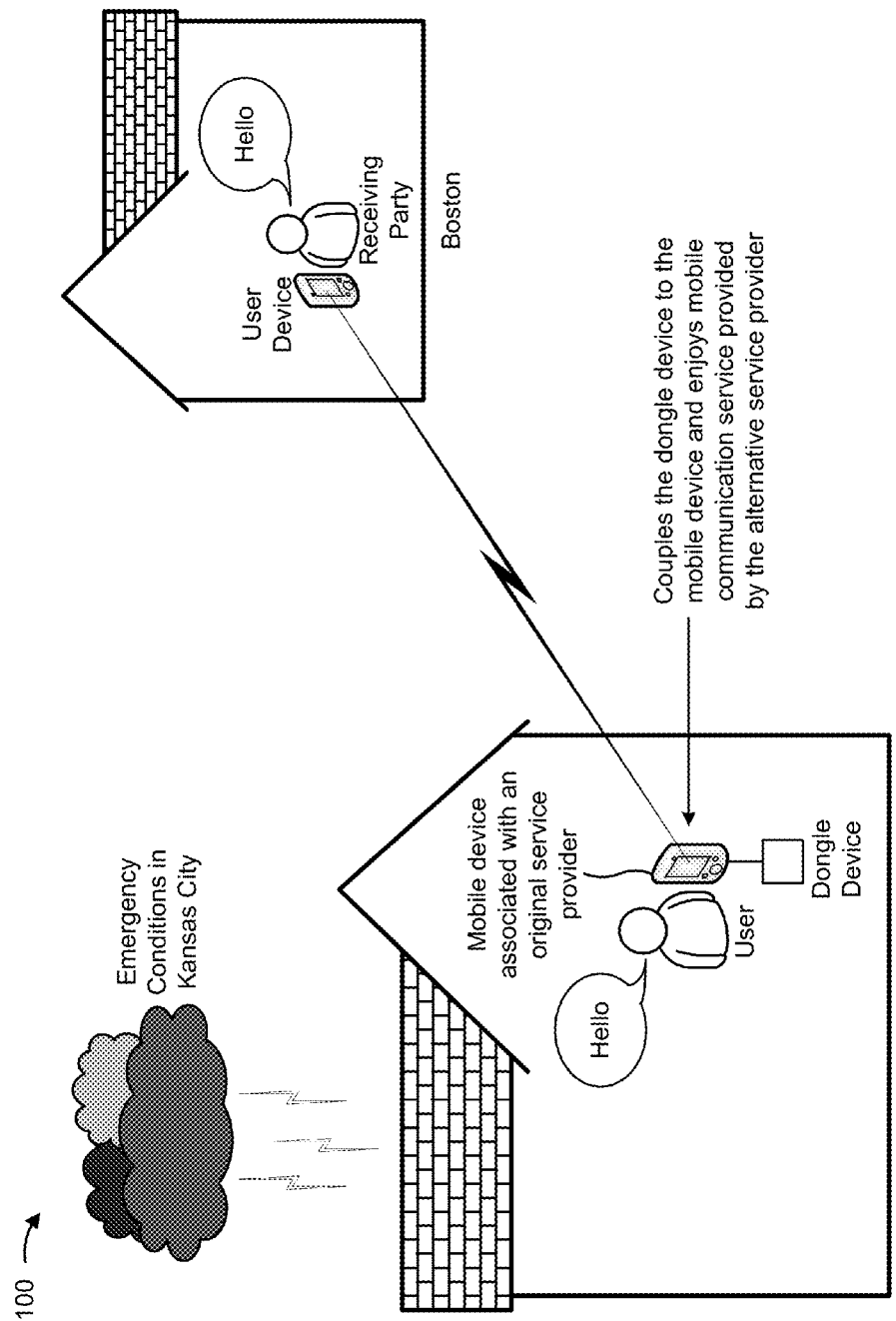

FIGS. 1A-1B are diagrams of an overview of an example implementation 100 described herein. As shown in FIG. 1A, assume that a user (e.g., User) of a mobile device, associated with an original service provider, is in a geographic location (e.g., Kansas City) and the original service provider cannot provide mobile communication service to the mobile device and/or the geographic location (e.g., emergency conditions in Kansas City prevent the original service provider from providing mobile communication service to the mobile device located in a home in Kansas City). As shown in FIG. 1A, assume the user of the mobile device desires to make a voice call (e.g., User wants to make a voice call to Receiving Party, not shown, in Boston). As shown in FIG. 1A, an alternative service provider is able to provide mobile communication service to the geographic location. The alternative service provider may provide the user with a dongle device, associated with the alternative service provider, to provide mobile communication service to the mobile device associated with the original service provider.

As shown in FIG. 1B, the user may couple the dongle device to the mobile device, associated with the original service provider, and enjoy mobile communication service provided by the alternative service provider (e.g., User may make a voice call to Receiving Party in Boston during the emergency conditions). In this way, the user may use the dongle device to receive mobile communication service provided by the alternative service provider, using a mobile device associated with an original service provider. The mobile device may benefit from receiving mobile communication service in situations where the original service provider fails to provide mobile communication service.

While the examples used herein focus on situations where an original service provider is not capable of providing mobile communication service to a mobile device, associated with the original service provider, the implementations described herein may also be applied in situations where the original service provider is capable of providing mobile communication service to the mobile device and the alternative service provider may override the mobile communication service provided by the original service provider. The implementations described herein may also be applied in situations where the mobile device is not associated with any service provider (e.g., the original service provider, the alternative service provider, etc.). In all implementations, the mobile device is not affiliated with the alternative service provider. Additionally, the dongle device does not need to couple with the mobile device and may provide the mobile communication service to the mobile device through a wireless communication, via a wireless interface.

A user of the mobile device, however, may prefer to benefit from the mobile communication service offered by an alternative service provider for various reasons (e.g., gets free minutes/data through the alternative service provider for a promotion). In this way, the user may save money by using the mobile communication service offered by the alternative service provider, try services provided by the alternative service provider without entering into a long-term service contract, or the like. These are just a few situations where the implementations described herein may be utilized, and other situations may be possible.

Additionally, the mobile device may save processing resources and battery power by avoiding unsuccessful attempts to connect to the original service provider network. The mobile device may also save network resources by avoiding unsuccessful mobile communications attempting to connect to the original service provider network.

Figure 2:
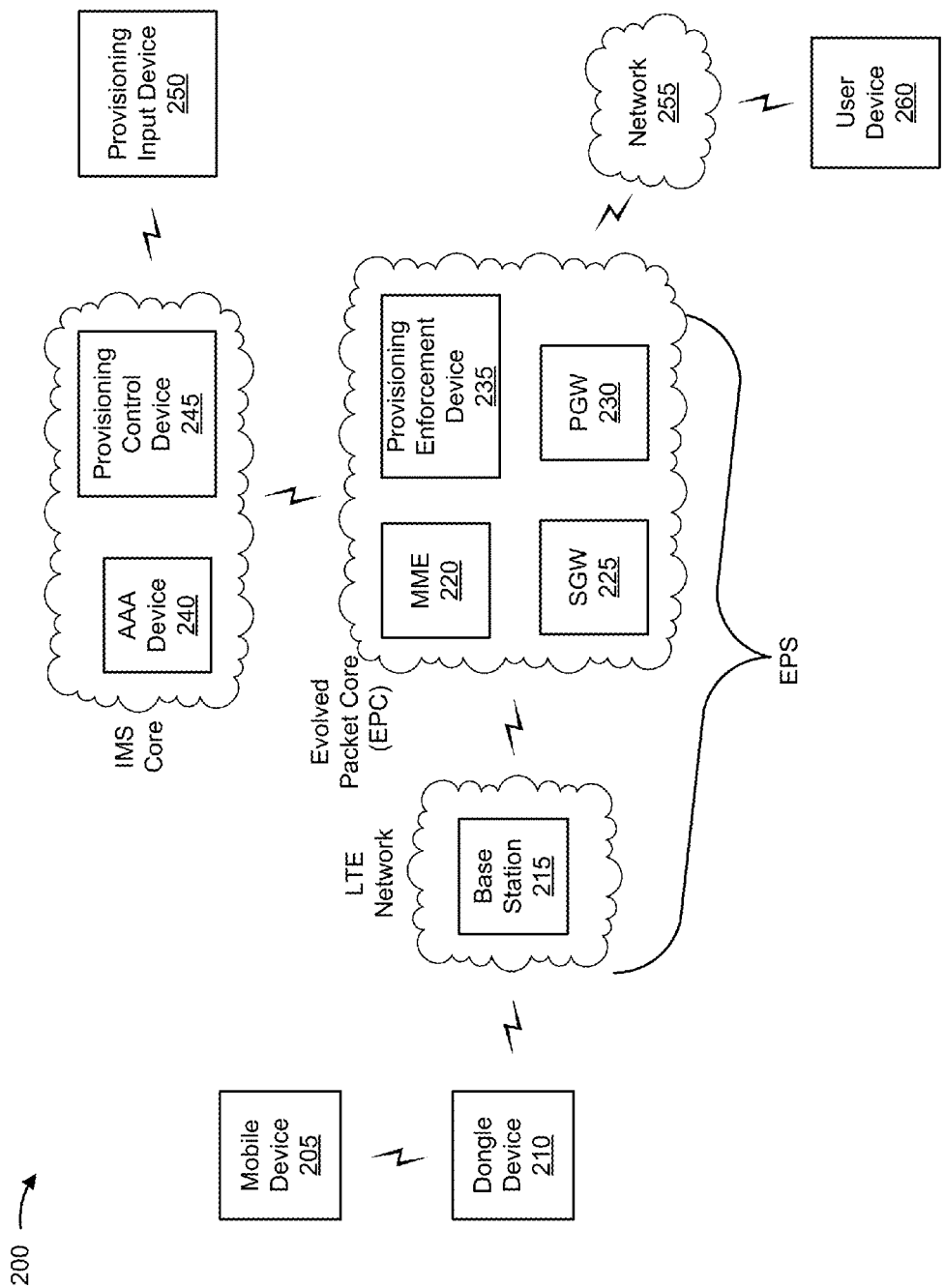
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include a mobile device 205, a dongle device 210, a base station 215, a mobility management entity device (MME) 220, a serving gateway (SGW) 225, a packet data network gateway (PGW) 230, a provisioning enforcement device 235, an authentication, authorization, and accounting server (AAA) 240, a provisioning control device 245, a provisioning input device 250, a network 255, and a user device 260. Devices of environment 200 may interconnect via wired connections, wireless connections, or a combination of wired and wireless connections.

Some implementations are described herein a being performed within a long term evolution (LTE) network for explanatory purposes. Some implementations may be performed within a wireless network that is not an LTE network, such as a third generation (3G) network.

Environment 200 may include an evolved packet system (EPS) that includes an LTE network and/or an evolved packet core (EPC) that operate based on a third generation partnership project (3GPP) wireless communication standard. The LTE network may include a radio access network (RAN) that includes one or more base stations 215 that take the form of evolved Node Bs (eNBs) via which mobile devices 205 communicate with the EPC. The EPC may include MME 220, SGW 225, PGW 230, and provisioning enforcement device 235 that enable mobile devices 205 to communicate with network 255 and/or an Internet protocol (IP) multimedia subsystem (IMS) core. The IMS core may include provisioning control device 245 and/or AAA 240, and may manage device registration and authentication, session initiation, campaign information, etc., associated with mobile devices 205 and/or network 255. Provisioning control device 245 and/or AAA 240 may reside in the EPC and/or the IMS core.

Mobile device 205 may include one or more devices capable of communicating with dongle device 210. For example, mobile device 205 may include a wireless communication device, a radiotelephone, a personal communications system (PCS) terminal (e.g., that may combine a cellular radiotelephone with data processing and data communications capabilities), a smart phone, a laptop computer, a tablet computer, a personal gaming system, and/or a similar type of device. Mobile device 205 may send traffic to and/or receive traffic from network 255 (e.g., via dongle device 210, via base station 215, via SGW 225, via PGW 230, via provisioning enforcement device 235, etc.).

Dongle device 210 may include one or more devices capable of communicating via a network (e.g., the LTE network, via base station 215, etc.). For example, dongle device 210, associated with an alternative service provider, may wirelessly communicate and/or couple to mobile device 205 to provide mobile communication service to mobile device 205, associated with an original service provider, regardless of whether the original service provider is capable of providing mobile communication service to mobile device 205. Dongle device 210 may also wirelessly communicate with and/or couple to mobile device 205 to provide mobile communication service to mobile device 205 where mobile device 205 is not associated with any service provider. Dongle device 210 may send, receive, and/or process mobile communication from base station 215.

Dongle device 210 may include one or more components, discussed further in detail herein, and/or may include software to instantiate dongle device 210 to mobile device 205 as a wireless modem. Dongle device 210 may contain one or more software clients to process voice calls and/or provisioning information and/or provisioning rules.

Base station 215 may include one or more devices capable of transferring traffic, such as audio, video, text, and/or other traffic, destined for and/or received from mobile device 205. In some implementations, base station 215 may include an eNB associated with the LTE network that receives traffic from and/or sends traffic to network 255 and/or user device 260 via SGW 225, PGW 230, and/or provisioning enforcement device 235. Additionally, or alternatively, one or more base stations 215 may be associated with a RAN that is not associated with the LTE network. Base station 215 may send traffic to and/or receive traffic from mobile device 205 via dongle device 210 and an air interface. In some implementations, base station 215 may include a small cell base station, such as a base station of a microcell, a picocell, and/or a femtocell.

MME 220 may include one or more devices, such as one or more servers, capable of managing authentication, activation, deactivation, and mobility functions associated with dongle device 210. In some implementations, MME 220 may perform operations relating to authentication of dongle device 210. Additionally, or alternatively, MME 220 may facilitate the selection of a particular SGW 225 and/or a particular PGW 230 to serve traffic to and/or from dongle device 210 (via provisioning enforcement device 235). MME 220 may perform operations associated with handing off dongle device 210 from a first base station 215 to a second base station 215 when dongle device 210 is transitioning from a first cell associated with the first base station 215 to a second cell associated with the second base station 215. Additionally, or alternatively, MME 220 may select another MME (not pictured), to which mobile device 205 should be handed off (e.g., when mobile device 205 moves out of range of MME 220).

SGW 225 may include one or more devices capable of routing packets. For example, SGW 225 may include one or more data processing and/or traffic transfer devices, such as a gateway, a router, a modem, a switch, a firewall, a network interface card (NIC), a hub, a bridge, a server, an optical add/drop multiplexer (OADM), or any other type of device that processes and/or transfers traffic. In some implementations, SGW 225 may aggregate traffic received from one or more base stations 215 associated with the LTE network, and may send the aggregated traffic to network 255 (e.g., via PGW 230 and provisioning enforcement device 235) and/or other network devices associated with the EPC and/or the IMS core. SGW 225 may also receive traffic from network 255 (via provisioning enforcement device 235 and/or PGW 230) and/or other network devices, and may send the received traffic to mobile device 205 via dongle device 210 and/or base station 215. Additionally, or alternatively, SGW 225 may perform operations associated with handing off dongle device 210 to and/or from an LTE network.

PGW 230 may include one or more devices capable of providing connectivity for dongle device 210 to external packet data networks (e.g., other than the depicted EPC and/or LTE network). For example, PGW 230 may include one or more data processing and/or traffic transfer devices, such as a gateway, a router, a modem, a switch, a firewall, a NIC, a hub, a bridge, a server, an OADM, or any other type of device that processes and/or transfers traffic. In some implementations, PGW 230 may aggregate traffic received from one or more SGWs 225, and may send the aggregated traffic to network 255 via provisioning enforcement device 235. Additionally, or alternatively, PGW 230 may receive traffic from network 255 via provisioning enforcement device 235, and may send the traffic to mobile device 205 via SGW 225, base station 215, and dongle device 210. PGW 230 may record data usage information (e.g., byte usage, minutes usage, etc.), and may provide the data usage information to provisioning control device 245 and/or AAA 240.

Provisioning enforcement device 235 may include one or more devices capable of inspecting traffic and applying one or more provisioning rules to the traffic. For example, provisioning enforcement device 235 may include a gateway, a router, a modem, a switch, a firewall, a NIC, a hub, a bridge, a server, an OADM, or a similar type of device. Provisioning enforcement device 235 may apply the provisioning rules to traffic received from PGW 230 and may instruct PGW 230 how to handle the traffic based on the provisioning rules. Different provisioning enforcement devices 235 may be associated with different geographic regions and/or cellular service areas, in some implementations.

AAA 240 may include one or more devices, such as one or more servers, that perform authentication, authorization, and/or accounting operations for communication sessions associated with mobile device 205. For example, AAA 240 may store data usage information for mobile device 205, for a user associated with mobile device 205, for dongle device 210, or the like.

Provisioning control device 245 may include one or more devices capable of receiving, generating, storing, processing, and/or providing information associated with a campaign to provide mobile communication service by an alternative service provider (e.g., provisioning information, provisioning rules, etc.). For example, provisioning control device 245 may include a server or a similar type of device. Provisioning control device 245 may receive provisioning information from provisioning input device 250, may generate provisioning rules based on the provisioning information, and may deploy the provisioning rules to one or more provisioning enforcement devices 235 (e.g., associated with one or more cellular service areas).

Provisioning input device 250 may include one or more devices capable of receiving, generating, storing, processing, and/or providing information associated with an alternative service campaign. For example, provisioning input device 250 may include a desktop computer, a laptop computer, a mobile phone, a server, or a similar type of device. Provisioning input device 250 may receive input, from a mobile communication service provider, that identifies provisioning information, and may provide the provisioning information to provisioning control device 245.

Network 255 may include one or more wired and/or wireless networks. For example, network 255 may include a cellular network (e.g., an LTE network, a 3G network, a code division multiple access (CDMA network, etc.), a public land mobile network (PLMN), a wireless local area network (e.g., a Wi-Fi network) a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, and/or a combination of these or other types of networks.

User device 260 may include one or more devices capable of communicating with a network (e.g., network 255). For example, user device 260 may include a wireless communication device, a radiotelephone, a personal communications system (PCS) terminal (e.g., that may combine a cellular radiotelephone with data processing and data communications capabilities), a landline telephone, a smart phone, a laptop computer, a tablet computer, a personal gaming system, and/or a similar device. User device 260 may send traffic to and/or receive traffic from network 255.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3A:
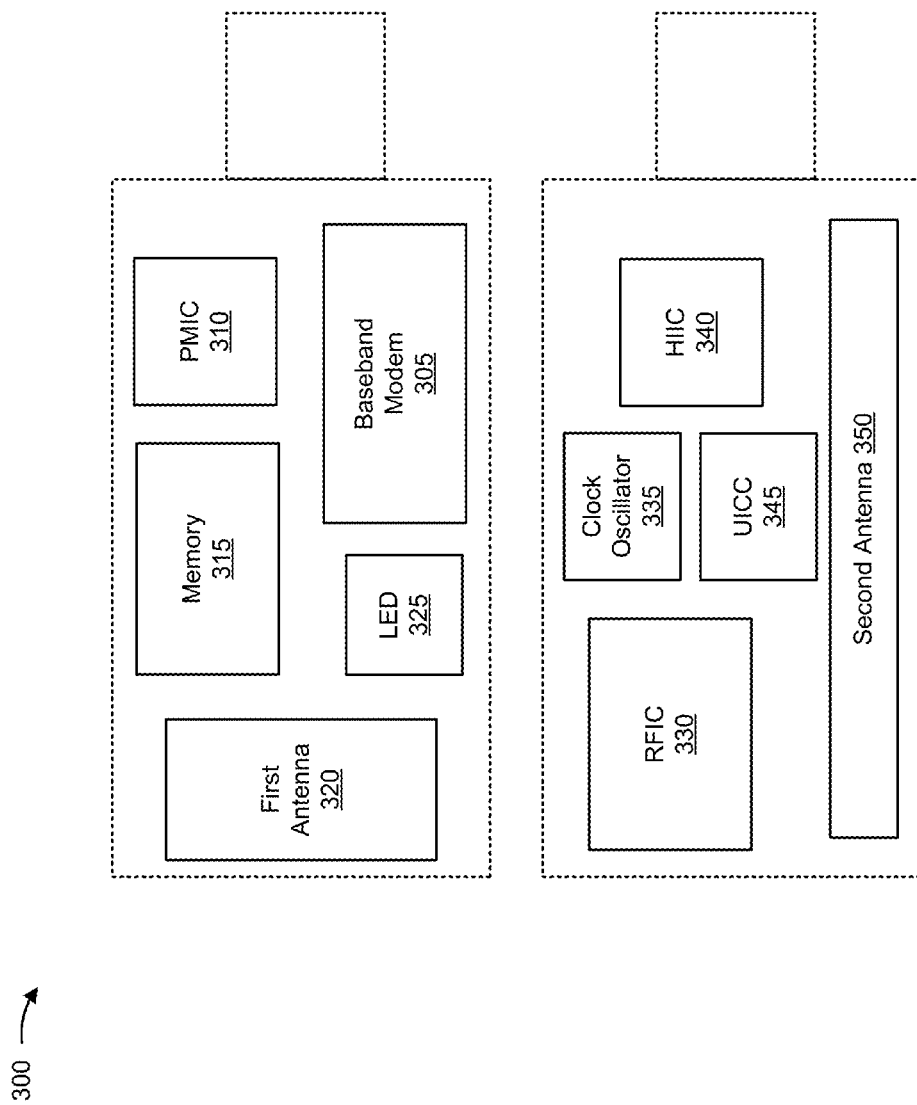
FIG. 3A-3B are diagrams of example components of one or more devices of FIG. 2.
Figure 3B:
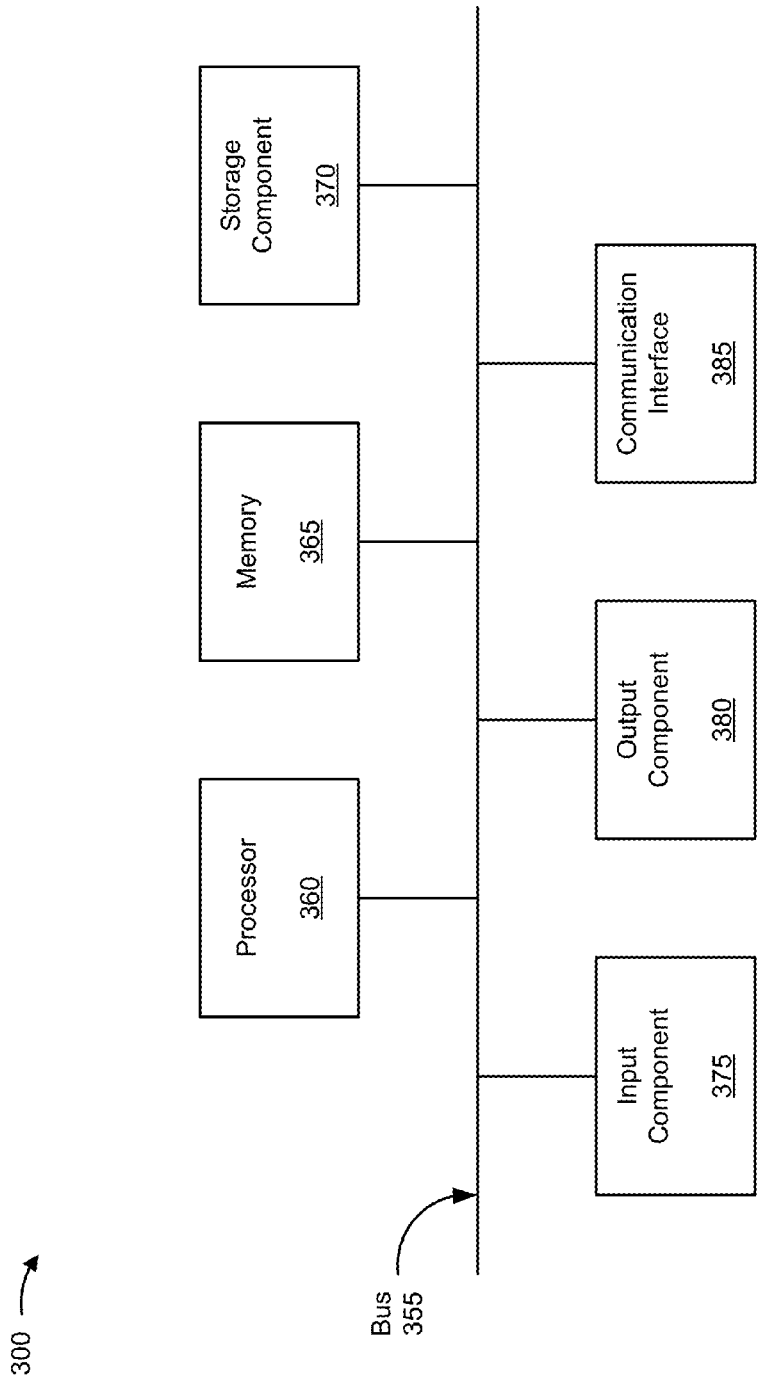

FIGS. 3A-3B are diagrams of example components of a device 300. In FIG. 3A, device 300 may correspond to dongle device 210. In some implementations, dongle device 210 may include one or more components of device 300. As shown in FIG. 3A, device 300 may include a baseband modem 305, a power management integrated circuit (PMIC) 310, a memory 315, a first antenna 320, a light-emitting diode (LED) 325, a radio frequency integrated circuit (RFIC) 330, a clock oscillator 335, a host interface integrated circuit (HIIC) 340, a universal integrated circuit card (UICC) 345, and a second antenna 350.

Baseband modem 305 may include one or more components capable of sending, receiving, and/or processing data and/or protocols, allowing for mobile device 205 to connect to a network (e.g., an LTE network), via dongle device 210. Power management integrated circuit (PMIC) 310 may include one or more components capable of controlling and/or distributing power to one or more other components of device 300. Memory 315 may include a random access memory (RAM), a read only memory (ROM), and/or another type of dynamic or static storage device (e.g., a flash memory, a magnetic memory, an optical memory, etc.) that stores information and/or instructions for use by baseband modem 305.

First antenna 320 may include one or more components capable of transmitting and receiving radio waves for sending and/or receiving mobile communication to/from one or more networks (e.g., LTE, code division multiple access (CDMA), Global system for mobile communication (GSM), etc.). LED 325 may including one or more components capable of emitting light when activated. LED 325 may provide indication that dongle device 210 is receiving power and/or functioning normally.

RFIC 330 may including one or more components capable of receiving, processing, and/or converting data in a form of a digital signal, from baseband modem 305 to an analog signal, to provide to first antenna 320 and/or second antenna 350. RFIC 330 may receive, process, and/or convert an analog signal received from first antenna 320 and/or second antenna 350 to a digital signal to provide to baseband modem 305. Clock oscillator 335 may include one or more components capable of providing a clock signal and/or capable of stabilizing a frequency for one or more components of device 300, including first antenna 320 and/or second antenna 350. Clock oscillator 335 may include a crystal clock oscillator, such as TXC0 or the like.

HIIC 340 may include one or more components capable of providing an interface for receiving and/or transmitting communications and/or information with other devices, including mobile device 205, as shown in FIG. 2. For example, HIIC 340 may include a universal serial bus (USB) interface, a Lightning connector, a wireless interface, or the like.

UICC 345 may include one or more components capable of receiving, processing, storing, and/or providing personal data. UICC 345 may ensure integrity and/or security of the personal data. For example, UICC 345 may include an embedded subscriber identity module (SIM) card that may store data (e.g., a dongle device identifier, network authorization data, personal security keys, etc.). The embedded SIM card may be provisioned in an alternative service provider network based on provisioning information and/or provisioning rules created for an alternative service campaign. The embedded SIM card may be provisioned as an emergency device with a fixed amount of voice and/or data allocated to each device. Depending on the extent of a disaster and associated recovery times, the alternative service campaign may be adjusted remotely using the dongle device identifier. The dongle device identifier may use a serial number (e.g., an integrated circuit card identifier (ICCID) associated with the SIM card included in UICC 345).

Second antenna 350 may include one or more components capable of transmitting and receiving radio waves for sending and/or receiving mobile communication to/from one or more networks (e.g., LTE, CDMA, GSM, etc.).

The number and arrangement of components shown in FIG. 3A are provided as an example. In practice, device 300 may include additional components, fewer components, different components, or differently arranged components than those shown in FIG. 3A. Additionally, or alternatively, a set of components (e.g. one or more components) of device 300 may perform one or more functions described as being performed by another set of components of device 300.

In FIG. 3B, device 300 may correspond to mobile device 205, dongle device 210, base station 215, MME 220, SGW 225, PGW 230, provisioning enforcement device 235, AAA 240, provisioning control device 245, provisioning input device 250, and/or a user device 260. In some implementations, mobile device 205, dongle device 210, base station 215, MME 220, SGW 225, PGW 230, provisioning enforcement device 235, AAA 240, provisioning control device 245, provisioning input device 250, and/or a user device 260 may include one or more devices 300 and/or one or more components of device 300. As shown in FIG. 3B, device 300 may include a bus 355, a processor 360, a memory 365, a storage component 370, an input component 375, an output component 380, and a communication interface 385.

Bus 355 may include a component that permits communication among the components of device 300. Processor 360 is implemented in hardware, firmware, or a combination of hardware and software. Processor 360 may include a processor (e.g., a central processing unit (CPU), a graphics processing unit (GPU), an accelerated processing unit (APU), etc.), a microprocessor, and/or any processing component (e.g., a field-programmable gate array (FPGA), an application-specific integrated circuit (ASIC), etc.) that can be programmed to perform a function. Memory 365 may include a random access memory (RAM), a read only memory (ROM), and/or another type of dynamic or static storage device (e.g., a flash memory, a magnetic memory, an optical memory, etc.) that stores information and/or instructions for use by processor 360.

Storage component 370 may store information and/or software related to the operation and use of device 300. For example, storage component 370 may include a hard disk (e.g., a magnetic disk, an optical disk, a magneto-optic disk, a solid state disk, etc.), a compact disk (CD), a digital versatile disc (DVD), a floppy disk, a cartridge, a magnetic tape, and/or another type of computer-readable medium, along with a corresponding drive.

Input component 375 may include a component that permits device 300 to receive information, such as via user input (e.g., a touch screen display, a keyboard, a keypad, a mouse, a button, a switch, a microphone, etc.). Additionally, or alternatively, input component 375 may include a sensor for sending information (e.g., a global positioning system (GPS) component, an accelerometer, a gyroscope, an actuator, etc.). Output component 380 may include a component that provides output information from device 300 (e.g., a display, a speaker, one or more light-emitting diodes (LEDs), etc.).

Communication interface 385 may include a transceiver-like component (e.g., a transceiver, a separate receiver and transmitter, etc.) that enables device 300 to communicate with other devices, such as via a wired connection, a wireless connection, or a combination of wired and wireless connections. Communication interface 385 may permit device 300 to receive information from another device and/or provide information to another device. For example, communication interface 385 may include an Ethernet interface, an optical interface, a coaxial interface, an infrared interface, a radio frequency (RF) interface, a universal serial bus (USB) interface, a Wi-ft interface, a cellular network interface, or the like.

Device 300 may perform one or more processes described herein. Device 300 may perform these processes in response to processor 360 executing software instructions stored by a computer-readable medium, such as memory 365 and/or storage component 370. A computer-readable medium is defined herein as a non-transitory memory device. A memory device includes memory space within a single physical storage device or memory space spread across multiple physical storage devices.

Software instructions may be read into memory 365 and/or storage component 370 from another computer-readable medium or from another device via communication interface 385. When executed, software instructions stored in memory 365 and/or storage component 370 may cause processor 360 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3B are provided as an example. In practice, device 300 may include additional components, fewer components, different components, or differently arranged components than those shown in FIG. 3B. Additionally, or alternatively, a set of components (e.g. one or more components) of device 300 may perform one or more functions described as being performed by another set of components of device 300.

FIG. 4 is a flow chart of an example process 400 for deploying an alternative service campaign for providing mobile communication service to a mobile device, associated with an original service provider, using a dongle device. In some implementations, one or more process blocks of FIG. 4 may be performed by provisioning control device 245. In some implementations, one or more process blocks of FIG. 4 may be performed by another device or a set of devices separate from or including provisioning control device 245, such as mobile device 205, dongle device 210, base station 215, MME 220, SGW 225, PGW 230, provisioning enforcement device 235, AAA 240, provisioning input device 250, and/or a user device 260.

As shown in FIG. 4, process 400 may include obtaining a list of dongle device identifiers (block 410). For example, provisioning control device 245 may obtain a list from provisioning input device 250 of dongle device identifiers for dongle devices 210 that may be used to provide mobile communication service by an alternative service to mobile device 205, associated with an original service provider. Dongle device 210 may include an embedded subscriber identity module (SIM) card that may store data (e.g., dongle device identifier, network authorization data, personal security keys, etc.). The dongle device identifier may use a serial number (e.g., an integrated circuit card identifier (ICCID) associated with the SIM card embedded in dongle device 210).

In some implementations, a user of provisioning control device 245 may input the list of dongle device identifiers. In some implementations, provisioning control device 245 may obtain the list of dongle device identifiers from provisioning input device 250 and/or another device (not shown).

In some implementations, provisioning control device 245 may include a user interface for receiving the dongle device identifiers. For example, a user may connect dongle device 210 and provisioning control device 245 (e.g., via a wired connection, a physical connection, a wireless connection, etc.). Dongle device 210 may provide, via a connection, the dongle device identifier.

As shown in FIG. 4, process 400 may include storing the list of dongle device identifiers (block 420). For example, provisioning control device 245 may store the list of dongle device identifiers. In some implementations, the list of dongle device identifiers may be stored in one or more memory devices associated with provisioning control device 245 and/or another device. In some implementations, provisioning control device 245 may provide, to another device for storage, the list of dongle device identifiers via a data structure.

As shown in FIG. 4, process 400 may include creating and/or updating an alternative service campaign (block 430). For example, provisioning control device 245 may obtain provisioning information for deploying an alternative service campaign, for providing mobile communication service, by an alternative service provider, to mobile device 205 associated with an original service provider.

The provisioning information may include the dongle device identifiers included on the list of dongle device identifiers obtained by provisioning control device 245. Additionally, or alternatively, the provisioning information may include an alternative service campaign name, information that identifies a geographic region associated with an alternative service campaign, information that identifies a time period during which to provide mobile communication service to mobile device 205, a quantity of data (e.g., in bytes) allotted to the alternative service campaign, a quantity of time (e.g., in minutes) allotted to the alternative service campaign, a data throughput rate permitted for the alternative service campaign, or the like.

Additionally, or alternatively, the provisioning information may be updated. For example, the provisioning information may be adjusted and/or updated when provisioning control device 245 obtains new provisioning information (e.g., modifying the geographic region; modifying the time period during which the alternative service campaign is valid; modifying the list of dongle device identifiers by adding or removing (e.g., de-provisioning) dongle device 210 associated with the alternative service campaign; etc.). For example, one or more dongle devices 210 may be removed from the list of dongle device identifiers after termination of the alternative service campaign (e.g., after the end of an emergency). Another example may be if one or more dongle devices 210 were being misused (e.g., used by unauthorized users and/or in an unauthorized manner) and may be removed from the list of dongle device identifiers.

As shown in FIG. 4, process 400 may include deploying the alternative service campaign (block 440). For example, provisioning control device 245 may deploy the alternative service campaign by generating provisioning rules based on the provisioning information. A provisioning rule may specify one or more campaign conditions for providing mobile communication service by the alternative service provider to mobile device 205, associated with the original service provider. Provisioning control device 245 may combine the generated provisioning rules into a configuration file, and may provide the configuration file to one or more provisioning enforcement devices 235 when deploying the alternative service campaign.

For example, provisioning control device 245 may deploy the alternative service campaign using the list of dongle device identifiers obtained automatically via provisioning input device 250, another device (not shown), or inputted by a user of provisioning control device 245. Provisioning control device 245 may deploy the alternative service campaign by providing provisioning rules, that instruct provisioning enforcement devices 235 how to handle network traffic, to provisioning enforcement devices 235 associated with the alternative service campaign. For example, the provisioning rules may identify the dongle device identifiers associated with the alternative service campaign.

Additionally, or alternatively, the provisioning rules may identify a geographic region in which the alternative service campaign is to be deployed. Provisioning control device 245 may identify provisioning enforcement devices 235 located in the geographic region, and may provide the provisioning rules to those provisioning enforcement devices 235.

Additionally, or alternatively, the provisioning rules may identify a time period during which the alternative service campaign is valid, and provisioning control device 245 may provide information that identifies the time period to provisioning enforcement devices 235 so that provisioning enforcement devices 235 may determine a time period during which to provide mobile communication service to mobile device 205, via dongle device 210.

Additionally, or alternatively, the provisioning rules may identify a quantity of time (e.g., in minutes) to be allocated to the alternative service campaign, and provisioning control device 245 may allocate some of the time to each of the identified provisioning enforcement devices 235 so that provisioning enforcement devices 235 may determine whether there is available time to be allocated to treat traffic as associated with the alternative service campaign.

Additionally, or alternatively, the provisioning rules may identify a quantity of data (e.g., in bytes) to be allocated to the alternative service campaign, and provisioning control device 245 may allocate some of the data to each of the identified provisioning enforcement devices 235 so that provisioning enforcement devices 235 may determine whether there is available data to be allocated to treat traffic associated with the alternative service campaign.

Additionally, or alternatively, the provisioning rules may be updated when provisioning control device 245 obtains a new list of dongle device identifiers. Additionally, or alternatively, provisioning control device 245 may update the alternative service campaign by providing new provisioning rules to provisioning enforcement device 235, based on updated provisioning information.

Additionally, or alternatively, provisioning control device 245 may provide a notification when the alternative service campaign deployment had been completed. For example, provisioning control device 245 may provide a notification to an alternative service provider (e.g., via an e-mail address, via provisioning input device 250, via another device associated with the alternative service provider's network, etc.). By using dongle device 210 associated with an alternative service campaign, mobile device 205, associated with an original service provider, may receive mobile communication service associated with an alternative service provider. Additionally, by providing provisioning rules permitting mobile communication service under the alternative service campaign, misuse of dongle device 210 and/or another device associated with the alternative service campaign may be avoided.

Although FIG. 4 shows example block of process 400, in some implementations, process 400 may include additional blocks, fewer blocks, difference blocks, or differently arranged blocks than those depicted in FIG. 4. Additionally, or alternatively, two or more of the blocks of process 400 may be performed in parallel.

Figure 5A:
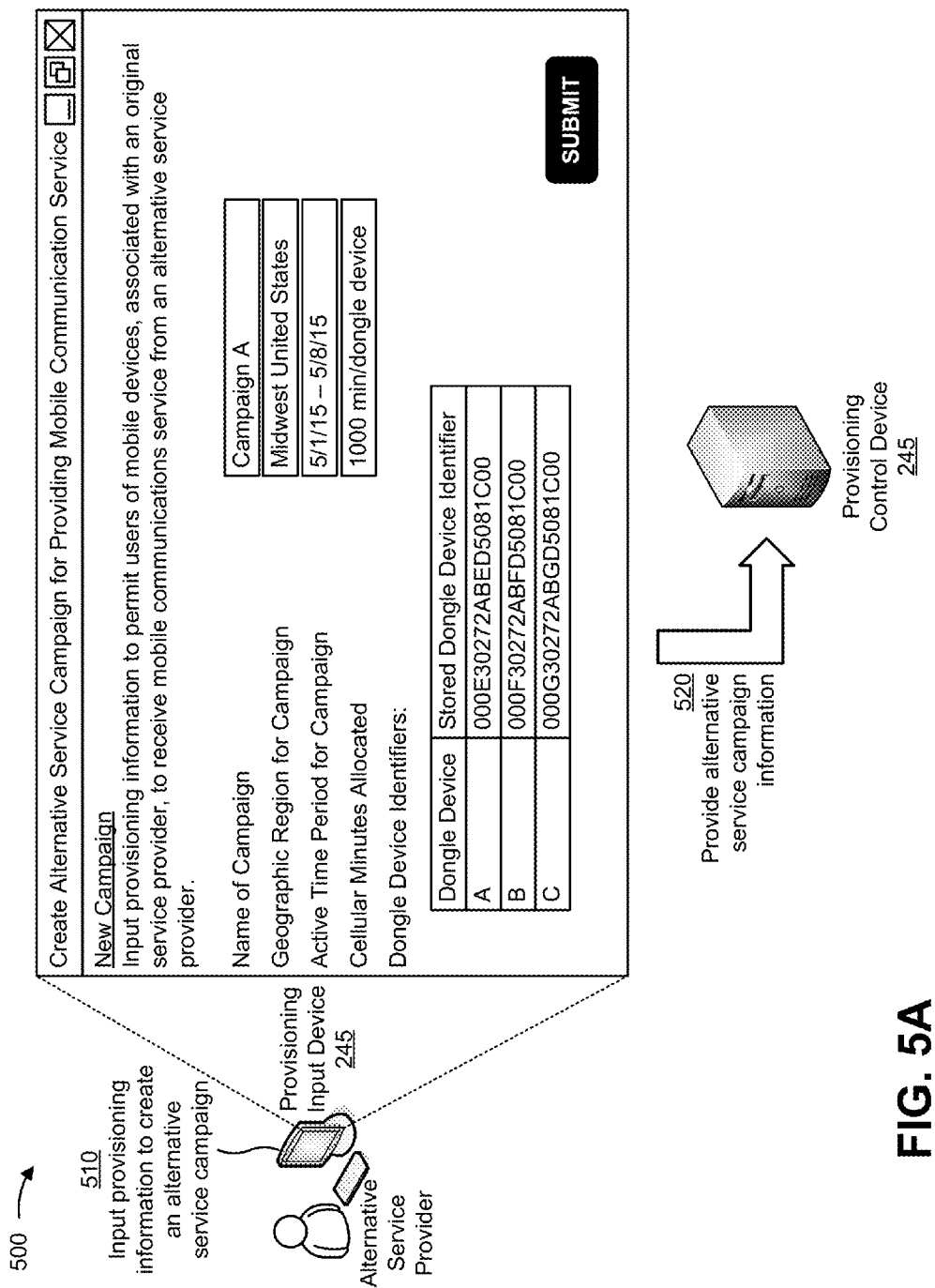
FIGS. 5A-5B are diagrams of an example implementation relating to the example process shown in FIG. 4.
Figure 5B:
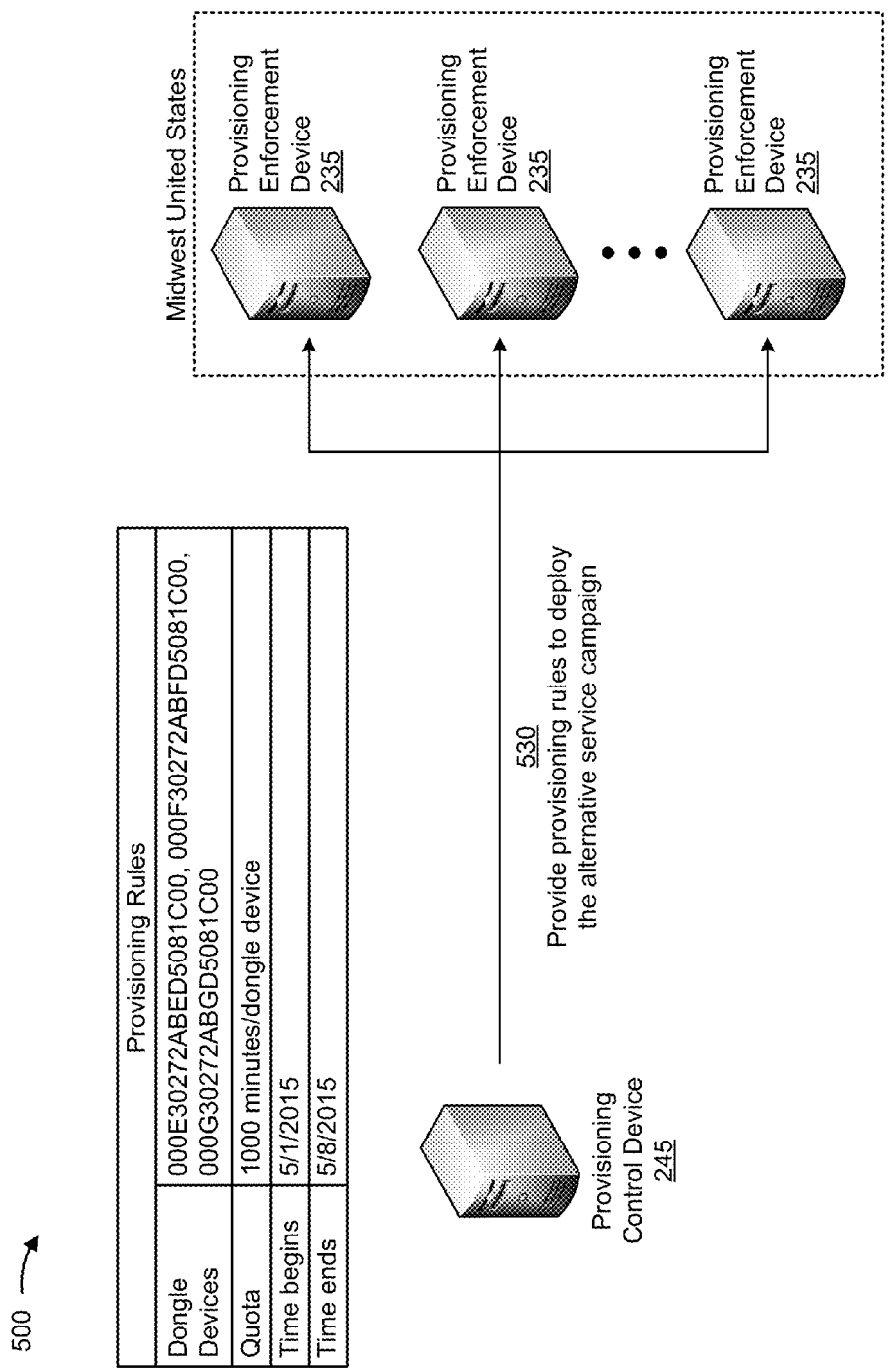

FIGS. 5A-5B are diagrams of an example implementation 500 relating to example process 400 shown in FIG. 4. FIGS. 5A-5B shows an example of deploying an alternative service campaign for providing mobile communication service to a mobile device, associated with an original service provider, using a dongle device.

As shown in FIG. 5A, and by reference number 510, assume that an alternative service provider interacts with provisioning input device 250 to input provisioning information to create an alternative service campaign. As shown, the alternative service provider inputs a name of the alternative service campaign (e.g., an alternative service campaign identifier), shown as "Campaign A," an identifier for a geographic region for the alternative service campaign, shown as "Midwest United States," an active time period for the alternative service campaign, shown as "May 1, 2015-May 8, 2015," and an amount of time (e.g., a maximum amount) to be provided with the alternative service campaign, shown as "1000 minutes/dongle device," (e.g., 1000 minutes per dongle device 210).

As shown, the alternative service provider inputs one or more dongle device identifiers associated with one or more dongle devices 210 (e.g., dongle device identifier=000E30272ABED5081C00 for Dongle Device A, dongle device identifier=000F30272ABFD5081C00 for Dongle Device B, dongle device identifier=000G30272ABGD5081C00 for Dongle Device C, etc.). As shown by reference number 520, the alternative service provider interacts with an input mechanism, shown as a "Submit" button, to cause provisioning input device 250 to provide the provisioning information to provisioning control device 245.

As shown in FIG. 5B, and by reference number 530, assume that provisioning control device 245 deploys Campaign A by providing provisioning rules for Campaign A (e.g., generated based on the provisioning information obtained from provisioning input device 250) to each provisioning enforcement device 235 located in the Midwest United States.

In some implementations, provisioning control device 245 and/or provisioning input device 250 may obtain and/or upload a file including provisioning information for creating an alternative service campaign.

As indicated above, FIGS. 5A-5B are provided merely as an example. Other examples are possible and may differ from what was described with regard to FIGS. 5A-5B.

Figure 6:
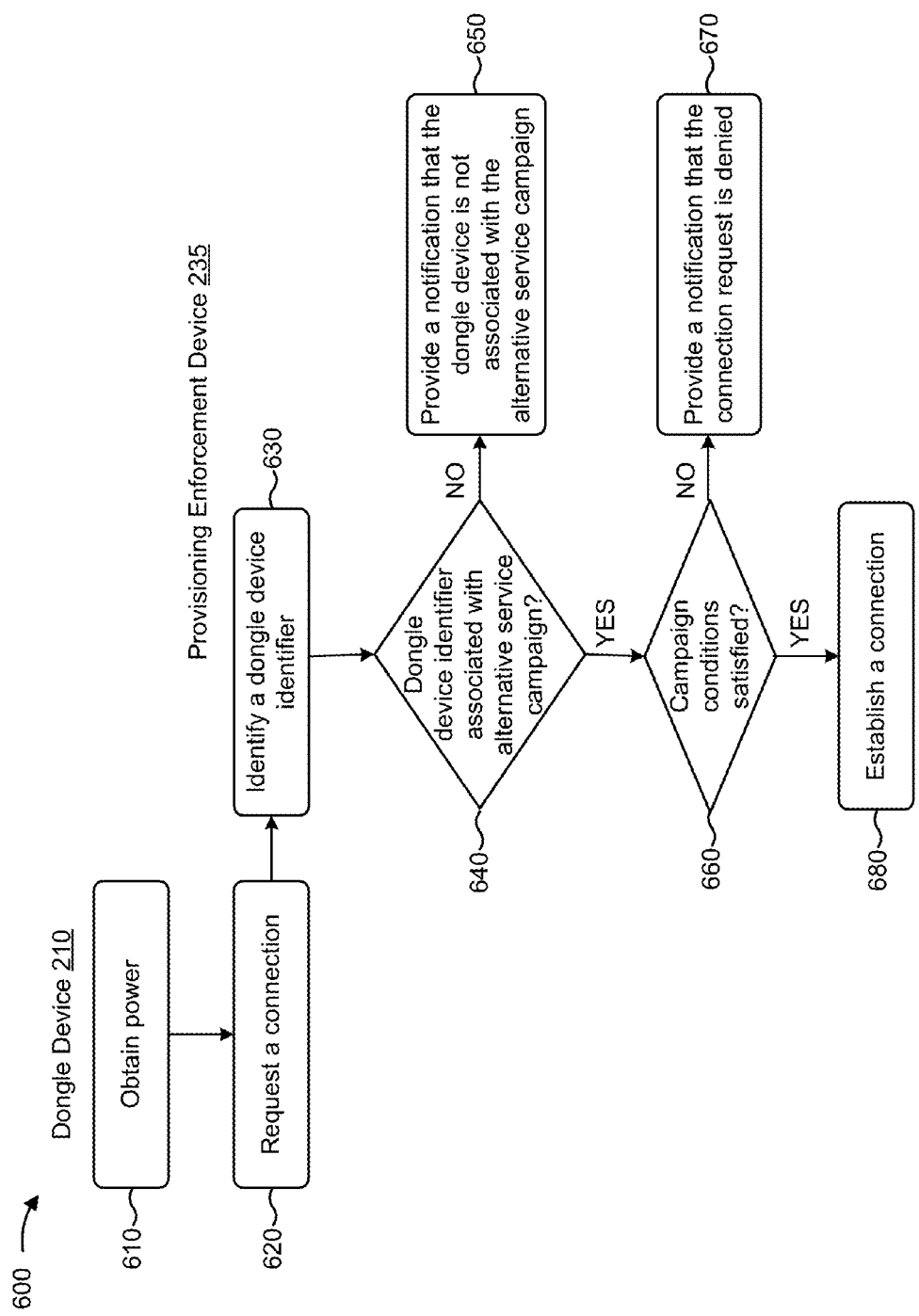
FIG. 6 is a flow chart of an example process implementing a deployed alternative service campaign for providing mobile communication service to a mobile device, associated with an original service provider, using a dongle device.

FIG. 6 is a flow chart of an example process 600 for implementing a deployed alternative service campaign for providing mobile communication service to a mobile device, associated with an original service provider, using a dongle device. In some implementations, one or more process blocks of FIG. 6 may be performed by dongle device 210 and/or provisioning enforcement device 235. In some implementations, one or more process blocks of FIG. 6 may be performed by another device or a set of devices separate from or including dongle device 210 and/or provisioning enforcement device 235, such as mobile device 205, base station 215, MME 220, SGW 225, PGW 230, provisioning input device 250, and/or a user device 260.

As shown in FIG. 6, process 600 may include obtaining power (block 610). For example, dongle device 210 may obtain power from a port (e.g., a universal serial bus (USB) port, a Lighting port, etc.) or a wireless interface associated with mobile device 205. Dongle device 210 may be plugged into the port associated with mobile device 205 to obtain power. In some implementations, dongle device 210 may obtain power from an external source (e.g., alternate current adapter, a battery pack, etc.). For example, dongle device 210 may obtain power from the external source if mobile device 205 cannot provide adequate current to power dongle device 210. In some implementations, dongle device 210 may obtain power from wireless charging capabilities of mobile device 205, via a wireless interface. In some implementations, a user of dongle device 210 may choose to provide power from an external source.

As further shown in FIG. 6, process 600 may include requesting a connection (block 620). For example, dongle device 210 may obtain instructions from mobile device 205, associated with an original service provider (or first service provider) to attempt a connection request for mobile communication service (e.g., to make a voice call, to send an e-mail, to access a website, to send a text, etc.) associated with dongle device 210 and an alternative service provider (or second service provider). Dongle device 210 may act as a host and use mobile device 210 as a master device to drive functionality used for the mobile communication service. Dongle device 210 may obtain information (e.g., a telephone number, an e-mail address, a uniform resource locator (URL) for accessing a website, etc.), included in the instructions to attempt a connection request.

Additionally, or alternatively, dongle device 210 may use stored information, included in an embedded SIM included in dongle device 210, to process the connection request. For example, the stored information may permit dongle device 210 to communicate with base station 215. Additionally, or alternatively, the stored information may instruct dongle device 210 how to communicate (e.g., provide the communication request) with provisioning enforcement device 235, via with base station 215, SGW 225 and PGW 230, where dongle device 210 acts as a wireless modem for the master device (e.g., mobile device 205).

Dongle device 210 may include software to direct mobile device 205 to use dongle device 210 directly if dongle device 210 is configured to wirelessly communicate with and/or coupled to mobile device 205. In some implementations, dongle device 210 may include software to direct mobile device 205 to use dongle device 210 directly if dongle device 210 is configured to wirelessly communicate with and/or coupled to mobile device 205 and if mobile communication service, provided by an original service provider and associated with mobile device 205, fails. In some implementations, dongle device 210 may include software to direct mobile device 205 to use dongle device 210 directly if dongle device 210 is configured to wirelessly communicate with and/or coupled to mobile device 205 and override mobile communication service provided by an original service provider and associated with mobile device 205.

In this way, mobile device 205 may save processing resources and battery power by avoiding unsuccessful attempts to connect to the original service provider network. Mobile device 205 may also save network resources by avoiding unsuccessful mobile communications attempting to connect to the original service provider network.

As further shown in FIG. 6, process 600 may include identifying a dongle device identifier (block 630). For example, provisioning enforcement device 235 may obtain the connection request from dongle device 210 for initiating a mobile communication, associated with an alternative service campaign, provided by an alternative service provider. The connection request may include traffic information, including a dongle device identifier (e.g., ICCID, international mobile subscriber identity (IMSI), a media access control (MAC) address, etc.). Provisioning enforcement device 235 may identify the dongle device identifier for dongle device 210 by reading from particular fields of packets carrying the traffic information to identify the dongle device identifier, provided by dongle device 210 while acting as a wireless modem for mobile device 205, As further shown in FIG. 6, process 600 may include determining whether the dongle device identifier is associated with an alternative service campaign (block 640). For example, provisioning enforcement device 235 may analyze the dongle device identifier to determine whether the dongle device identifier is associated with an alternative service campaign.

In some implementations, provisioning enforcement device 235 may compare the dongle device identifier to stored dongle device identifiers, obtained from provisioning control device 245 and associated with the alternative service campaign. If the dongle device identifier matches a stored dongle device identifier, then provisioning enforcement device 235 may determine that the dongle device identifier is associated with the alternative service campaign. If the dongle device identifier does not match a stored dongle device identifier, then provisioning enforcement device 235 may determine that the dongle device identifier is not associated with the alternative service campaign.

As further shown in FIG. 6, if the dongle device identifier does not match a stored dongle device identifier, then process 600 may include providing a notification that the dongle device is not associated with the alternative service campaign (block 650). For example, provisioning enforcement device 235 may provide a notification to mobile device 205, via dongle device 210, that dongle device 210 is not associated with the alternative service campaign. In some implementations, provisioning enforcement device 235 may provide the notification for display on a display, of mobile device 205, via dongle device 210, and/or dongle device 210. In some implementations, provisioning enforcement device 235 may deny the connection request. In some implementations, provisioning enforcement device 235 may ignore the connection request.

As further shown in FIG. 6, if the dongle device identifier matches a stored dongle device identifier, then process 600 may include determining whether campaign conditions are satisfied (block 660). For example, provisioning enforcement device 235 may determine whether one or more campaign conditions are satisfied for the alternative service campaign. A campaign condition may be identified in a provisioning rule obtained from provisioning device 235 during deployment of the alternative service campaign.

As an example, a campaign condition may specify a time period during which the alternative service campaign is valid. If the request to access mobile communication service associated with the alternative service campaign is obtained during the time period, then the campaign condition may be satisfied. If the request to access mobile communication service, associated with the alternative service campaign, is obtained outside the time period, then the campaign condition may not be satisfied. As another example, a campaign condition may specify a geographic region in which the alternative service campaign is valid. If the request to access mobile communication service, associated with the alternative service campaign, is obtained from the geographic region, then the campaign condition will be satisfied. If the request to access mobile communication service, associated with the alternative service campaign, is not obtained from the geographic region, then the campaign condition may not be satisfied.

As another example, a campaign condition may specify a quantity of bytes and/or time (e.g., minutes) reserved for the alternative service campaign. Provisioning enforcement device 235 and/or PGW 230 may determine whether there are any bytes and/or time, out of the original reserved amount of bytes and/or time, available to be allocated to the request to access mobile communication service associated with the alternative service campaign. For example, provisioning enforcement device 235 may periodically request and/or may periodically obtain, from provisioning control device 245, information that identifies a quantity of available bytes or available time remaining in the alternative service campaign. Provisioning control device 245 may obtain information regarding used bytes and/or time from one or more provisioning enforcement devices 235, and may update the quantity of available bytes and/or time based on the obtained information. If there are available bytes and/or time to be allocated to the request to access the mobile communication service, associated with the alternative service campaign, then the campaign condition may be satisfied.

If there are no available bytes (or not enough available bytes) to be allocated to the mobile communication service associated with the alternative service campaign, then provisioning enforcement device 235 may request additional bytes from provisioning control device 245. Additionally, or alternatively, provisioning enforcement device 235 may receive additional bytes from provisioning enforcement device 235 with or without sending a request. When provisioning enforcement device 235 determines that there are enough available bytes to meet the request, provisioning enforcement device 235 may determine that the campaign condition is satisfied. If provisioning device 235, however, does not allocate additional bytes to the request to access mobile communications associated with the alternative service campaign, then the campaign condition may not be satisfied.

As another example, a campaign condition may be satisfied when the alternative service campaign is not marked as paused, and may not be satisfied when the alternative service campaign is marked as paused. In some implementations, provisioning control device 245 and/or provisioning enforcement device 235 may mark the alternative service campaign as paused based on information obtained from provisioning input device 250. For example, an alternative service provider may wish to pause the alternative service campaign, and may provide an instruction to pause the alternative service campaign using provisioning input device 250.

In some implementations, provisioning enforcement device 235 may determine whether multiple campaign conditions, described herein, are satisfied. In some implementations, campaign conditions may be satisfied when all the campaign conditions created for the alternative service campaign are satisfied. In some implementations, campaign conditions may be satisfied when a particular quantity of the campaign conditions (e.g., a majority of the campaign conditions) created for the alternative service campaign are satisfied.

As further shown in FIG. 6, if campaign conditions are not satisfied, process 600 may include providing a notification that the connection request is denied (block 670). For example, if provisioning enforcement device 235 determines that the campaign conditions are not satisfied, then provisioning enforcement device 235 may notify mobile device 205, via dongle device 210, that the connection is denied.

The notification may indicate why the connection request was denied. For example, the notification may indicate that the campaign conditions were not satisfied. In some implementations, provisioning enforcement device 235 may provide a specific notification as to which one or more campaign conditions were not satisfied (e.g., not enough available bytes and/or time, a request during an invalid time period, the alternative service campaign has been paused by the alternative service provider, etc.).

Mobile device 205 may provide the notification for display so that a user may understand why mobile communication service associated with the alternative service campaign is not being provided. In some implementations, provisioning enforcement device 235 may ignore the connection request in this case.

As further shown in FIG. 6, if campaign conditions are satisfied, process 600 may include establishing a connection (block 680). For example, if provisioning enforcement device 235 determines that the campaign conditions are satisfied, then provisioning enforcement device 235 may provide mobile communication service to mobile device 205 via dongle device 210, where dongle device 210 acts as a wireless modem for mobile device 205. In some implementations, PGW 230 and/or provisioning enforcement device 235 may count a quantity of data (e.g., in bytes) and/or time (e.g., in minutes) used in association with the mobile communication service, and may provide data usage information (e.g., that identifies a quantity of data and/or minutes used) to provisioning control device 245.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

Figure 7A:
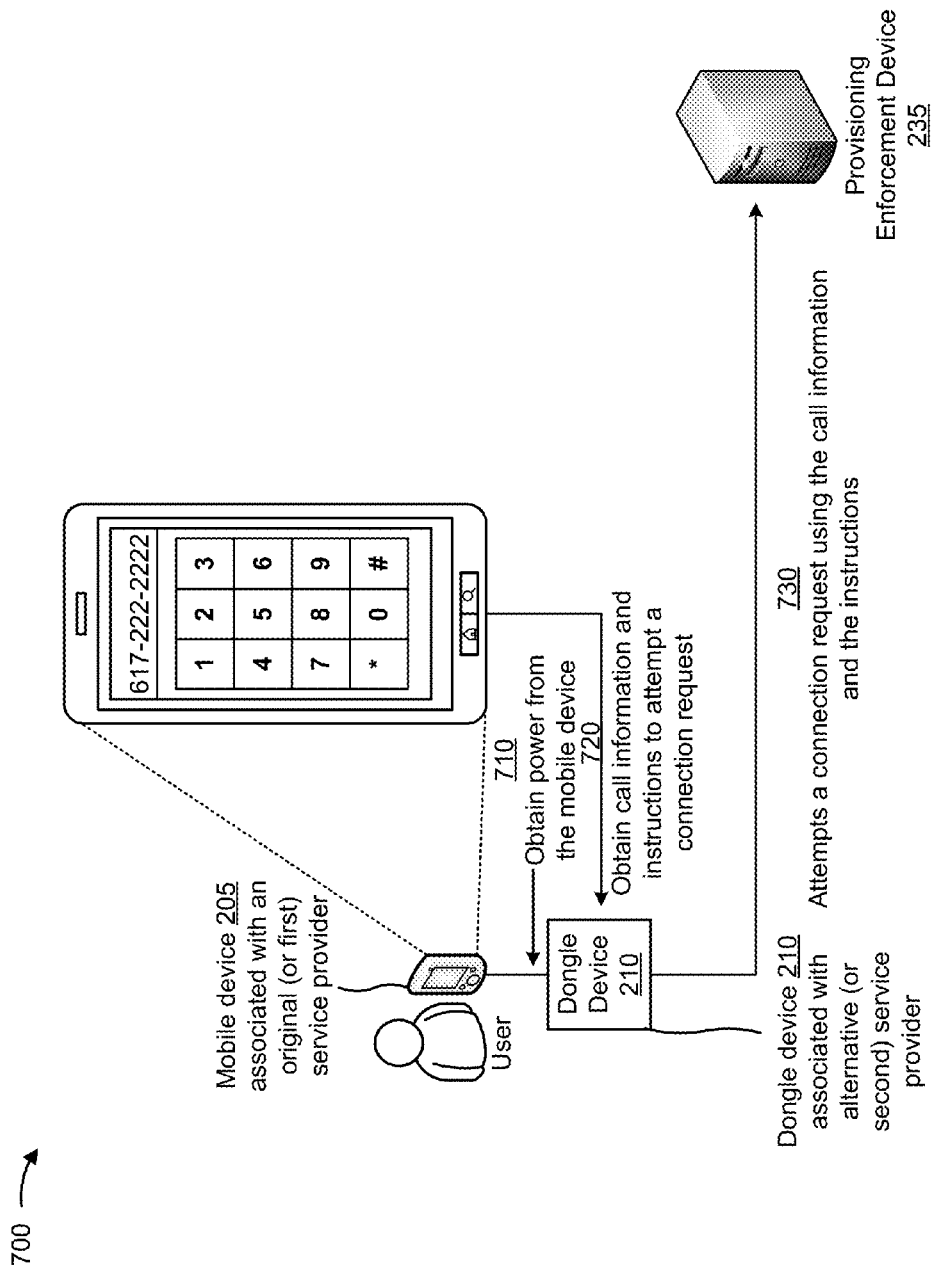
FIGS. 7A-7C are diagrams of an example implementation relating to the example process shown in FIG. 6.
Figure 7B:
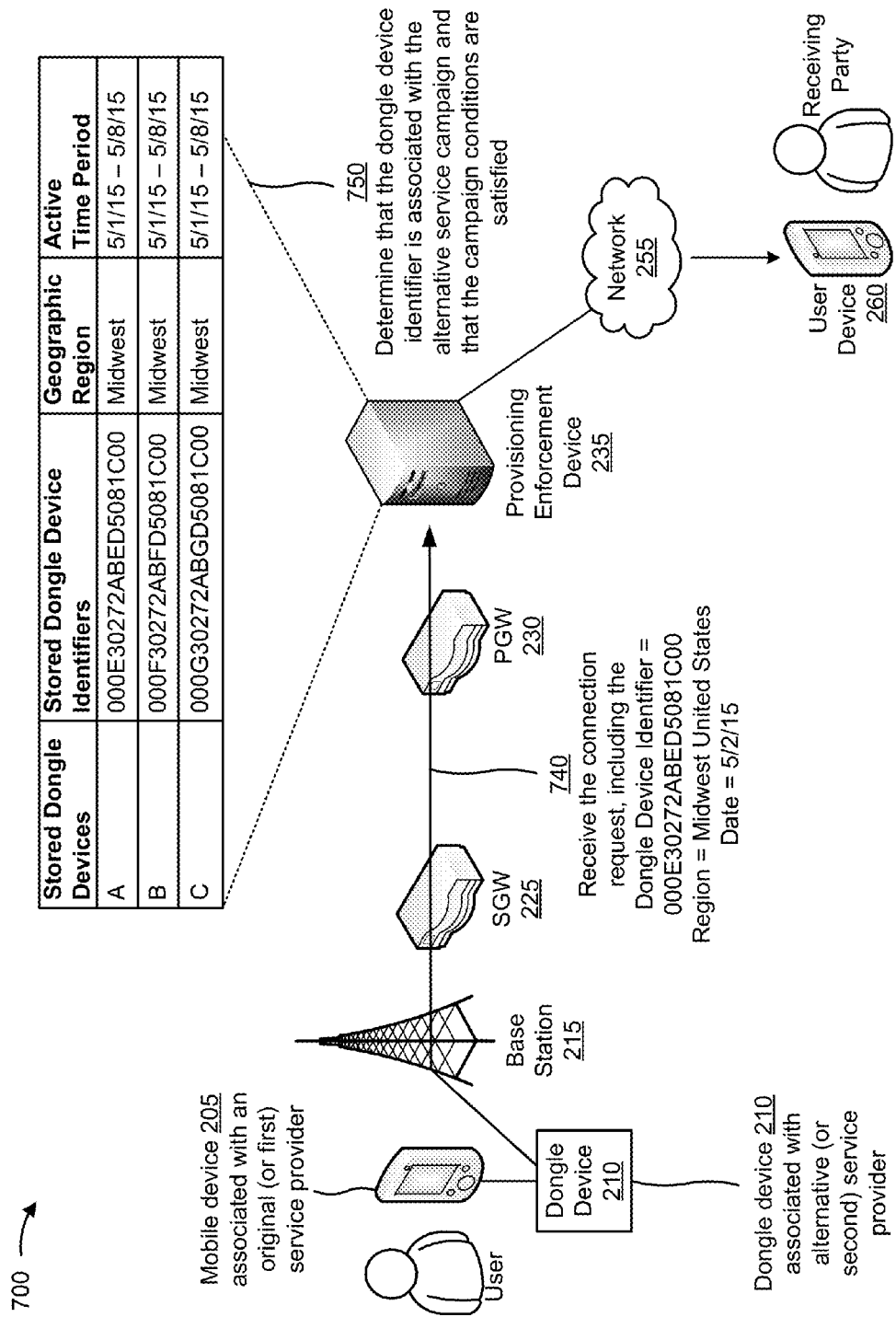
Figure 7C:
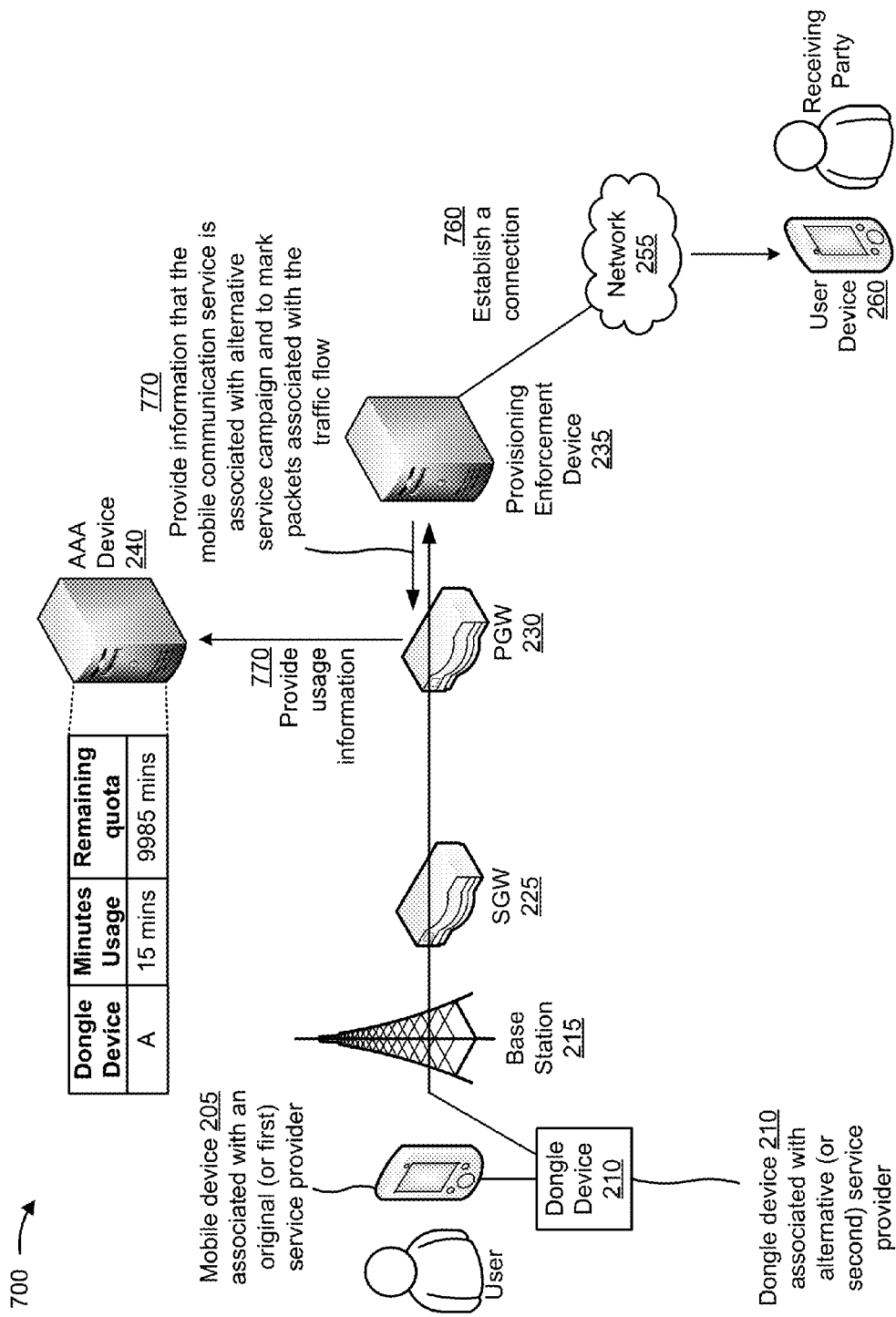

FIGS. 7A-7C are diagrams of an example implementation 700 relating to example process 600 shown in FIG. 6. FIGS. 7A-7C show an example of implementing a deployed alternative service campaign (or service campaign) for providing mobile communication service to a mobile device, associated with an original service provider device, using a dongle device.

As shown in FIG. 7A, assume User is at a geographic location (e.g., a home located in Kansas City). Assume further that User is a user of a mobile device (e.g., mobile device 205) associated with a first service provider (e.g., original service provider). Assume further that the first service provider cannot provide mobile communication service to the mobile device and/or the geographic region (e.g., emergency conditions in the Midwest, where Kansas City is located, prevent the first service provider from providing mobile communication service). Assume that User receives a dongle device (e.g., dongle device 210) to access mobile communication service associated with an alternative service campaign.

As shown in FIG. 7A, and by reference number 710, dongle device 210 is coupled to mobile device 205 and obtains power from the mobile device (e.g., User couples the dongle device with mobile device 205). Dongle device 210 is associated with a second service provider (e.g., alternative service provider), associated with the alternative service campaign. As shown in FIG. 7A, and by reference number 720, dongle device 210 obtains call information (e.g., a telephone number—617-222-2222 of Receiving Party, not shown) from mobile device 205 and instructions to attempt a connection request (e.g., User dials the telephone number of Receiving Party using mobile device 205). Dongle device 210 acts as a host and uses mobile device 205 as a master to drive functionality. Dongle device 210 includes a software client to receive and/or process the call information provided by mobile device 205.

As shown in FIG. 7A, and by reference number 730, dongle device 210 attempts a connection request for mobile communication service from provisioning enforcement device 235 using the call information and instructions obtained from mobile device 205. The connection request includes a dongle device identifier (e.g., dongle device identifier=000E30272ABED5081C00) for dongle device 210. The connection request also includes traffic information indicating a geographic region from where the connection request was attempted (e.g., a specific base station 215, for example, a base station 215 located in the Midwest from where the connection request was attempted). The connection request may also include information indicating a date (e.g., May 2, 2015) when the connection request was attempted.

As shown in FIG. 7B, and by reference number 740, provisioning enforcement device 235 obtains the connection request from dongle device 210, including the dongle device identifier, via base station 215, SGW 225, and PGW 230.

As shown in FIG. 7B, and by reference number 750, provisioning enforcement device 235 determines whether the dongle device identifier is associated with an alternative service campaign by comparing the dongle device identifier with stored dongle device identifiers provided in the deployed alternative service campaign. As shown in FIG. 7B, and by reference number 750, provisioning enforcement device 235 determines that the dongle device identifier is associated with the alternative service campaign since the dongle device identifier matches one of the stored dongle device identifiers obtained from a deployed alternative service campaign.

As further shown in FIG. 7B, and by reference number 750, provisioning enforcement device 235 determines that campaign conditions are satisfied (e.g., the connection request is made from Kansas City, a location within the Midwest geographic region, and which matches a campaign condition for the alternative service campaign; the connection request is made on May 2, 2015 and is within the active time period of May 1, 2015-May 8, 2015 for the alternative service campaign, etc.). Thus, as shown by reference number 750, provisioning enforcement device 235 determines that the dongle device identifier is associated with the alternative service campaign and that the campaign conditions are satisfied.

As shown in FIG. 7C, and by reference number 760, PGW 230 may assist in establishing the traffic flow between mobile device 205, via dongle device 210, and user device 260 via provisioning enforcement device 235. As shown in FIG. 7C, and by reference number 770, provisioning enforcement device 235 provides information to PGW 230 that the mobile communication service is associated with the service campaign and to mark packets associated with traffic flow so that usage information (bytes or minutes used) may be determined for dongle device 210.

As shown by FIG. 7C, and by reference number 780, PGW 230 provides usage information for the traffic flow from mobile device 205 via dongle device 210, and user device 260 to AAA 240. Based on the received usage information, AAA 240 updates accounting information for dongle device 210, which indicates a quantity of minutes used by dongle device 210 in association with the established traffic flow. In this way, AAA 240 may determine whether dongle device 210 has minutes remaining for the mobile communications and/or future mobile communications based on the provisioning rules associated with the alternative service campaign.

As indicated above, FIGS. 7A-7C are provided merely as an example. Other examples are possible and may differ from what was described with regard to FIGS. 7A-7C.

Implementations described herein enable a mobile device, associated with an original service provider, to receive mobile communication service from an alternative service provider, via a dongle device, regardless of whether the original service provider is capable of providing mobile communication service to the mobile device. The mobile device may save processing resources and battery power by avoiding unsuccessful attempts to connect to the original service provider network. The mobile device may also save network resources by avoiding unsuccessful mobile communications attempting to connect to the original service provider network. By enabling provisioning and de-provisioning of one or more dongle devices, associated with the alternative service campaign, the alternative service provider network may determine how to conserve or utilize network resources in order to manage and/or maximize efficiencies of the alternative service provider network.

A user of the mobile device may benefit from cost-savings by using mobile communications, associated with an alternative service campaign, by receiving free service, receiving the benefit of experiencing mobile communications offered by the alternative service provider without entering into a long-term contract, or the like. These are just a few situations where the implementations described herein by utilized, and other situations may be possible.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, or a combination of hardware and software.

To the extent the aforementioned embodiments collect, store, or employ personal information provided by individuals, it should be understood that such information shall be used in accordance with all applicable laws concerning protection of personal information. Additionally, the collection, storage, and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "group" and "set" are intended to include one or more items (e.g., related items, unrelated items, a combination of related items and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:
1. A system, comprising:
   one or more devices to:
      receive, from a dongle device, a connection request to receive mobile communication service associated with a service campaign for a mobile device,
         the mobile device being associated with a first service provider,
         the dongle device being associated with a second service provider and the service campaign and being configured to provide the mobile communication service from the second service provider to the mobile device,
         the connection request including a dongle device identifier associated with the dongle device;
      compare the dongle device identifier included in the connection request with stored dongle device identifiers associated with the service campaign;
      determine that the dongle device identifier included in the connection request is associated with the service campaign if the dongle device identifier matches one of the stored dongle device identifiers; and cause a connection to be established to provide mobile communication service to the mobile device via the dongle device based on the dongle device identifier being associated with the service campaign.

2. The system of claim 1, where the dongle device is coupled and removable from the mobile device.

3. The system of claim 1, where the one or more devices are further to:

determine whether campaign conditions, associated with the service campaign, are satisfied; and, when causing the connection to be established, where the one or more devices are to:

cause the connection to be established to provide the mobile communication service to the mobile device via the dongle device when the campaign conditions are satisfied.

4. The system of claim 3, where, when determining whether the campaign conditions, associated with the service campaign, are satisfied, the one or more devices are to:

determine whether a particular quantity of the campaign conditions, associated with the service campaign, are satisfied; and, when causing the connection to be established, where the one or more devices are to:

cause the connection to be established to provide the mobile communication service to the mobile device via the dongle device when the particular quantity of the campaign conditions are satisfied.

5. The system of claim 3, where, when determining whether the campaign conditions, associated with the service campaign, are satisfied, the one or more devices are to:

deny the connection request when the campaign conditions are not satisfied; and provide a notification to the dongle device and/or the mobile device that the connection request is denied.

6. The system of claim 3, where, when determining whether the campaign conditions, associated with the service campaign, are satisfied, the one or more devices are to:

deny the connection request when a particular quantity of the campaign conditions are not satisfied; and provide a notification to the dongle device and/or the mobile device that the connection request is denied.

7. The system of claim 3, where, when determining whether the campaign conditions, associated with the service campaign, are satisfied, the one or more devices are to:

ignore the connection request when the campaign conditions are not satisfied.

8. The system of claim 1, where a mobile communication service, associated with the first service provider, is unavailable to the mobile device.

9. A computer-readable medium storing instructions, the instructions comprising:

one or more instructions that, when executed by one or more processors, cause the one or more processors to:

receive, from a dongle device that is coupled to a mobile device, a connection request to receive mobile communication service, associated with a service campaign, for the mobile device, the mobile device not being associated with a service provider associated with the service campaign, the dongle device being associated with the service provider and the service campaign and being configured to provide the mobile communication service from the service provider to the mobile device, the connection request including a dongle device identifier associated with the dongle device;

compare the dongle device identifier included in the connection request with stored dongle device identifiers associated with the service campaign;

determine that the dongle device identifier included in the connection request is associated with the service campaign if the dongle device identifier matches one of the stored dongle device identifiers; and permit a connection to be established to provide mobile communication service to the mobile device via the dongle device based on the dongle device identifier being associated with the service campaign.

10. The computer-readable medium of claim 9, where the one or more instructions, when executed by the one or more processors, further cause the one or more processors to:

count a quantity of time and/or data used in association with the connection to determine usage information; and provide the usage information to a packet data network gateway and/or an authentication, authorization, and accounting server.

11. The computer-readable medium of claim 9, where, when determining that the dongle device identifier included in the connection request is associated with the service campaign, the one or more instructions, when executed by the one or more processors, further cause the one or more processors to:

deny the connection request when the dongle device identifier does not match any of the stored dongle device identifiers; and provide a notification to the dongle device and/or the mobile device that the connection request is denied.

12. The computer-readable medium of claim 9, where the connection request includes a telephone number, an e-mail address, and/or a uniform resource locator.

13. The computer-readable medium of claim 9, where the dongle device is configured to receive power from the mobile device and receive an instruction to attempt the connection request.

14. The computer-readable medium of claim 9, where the stored dongle device identifiers associated with the service campaign are provided by a provisioning control device.

15. A method, comprising:

receiving, by one or more devices and from a dongle device, a connection request for receiving mobile communication service associated with a service campaign for a mobile device, the mobile device being associated with a first service provider, the dongle device being associated with a second service provider and the service campaign and being configured to provide the mobile communication service from the second service provider to the mobile device, the connection request including a dongle device identifier associated with the dongle device;

comparing, by the one or more devices, the dongle device identifier included in the connection request with stored dongle device identifiers associated with the service campaign;

determining, by the one or more devices, that the dongle device identifier included in the connection request is associated with the service campaign if the dongle device identifier matches one of the stored dongle device identifiers;

determining, by the one or more devices, whether a campaign condition, associated with the service campaign, is satisfied; and permitting, by the one or more devices, a connection to be established for providing mobile communication service to the mobile device via the dongle device based on the dongle device identifier being associated with the service campaign and the campaign condition being satisfied.

16. The method of claim 15, where determining whether the campaign condition is satisfied, comprises:

determining that the connection request is within a valid time period for the service campaign, the valid time period being specified in the campaign condition, the campaign condition being satisfied when the connection request is within the valid time period.

17. The method of claim 15, where determining whether the campaign condition is satisfied, comprises:

determining, that the connection request originated from within a geographic region for the service campaign, the geographic region being specified in the campaign condition, the campaign condition being satisfied when the connection request originated from within the geographic region.

18. The method of claim 15, where determining whether the campaign condition is satisfied, comprises:

determining that a quantity of time, allotted to the service campaign, is available for the mobile communication service, the quantity of time, allotted to the service campaign, being specified in the campaign condition, the campaign condition being satisfied when the quantity of time is available.

19. The method of claim 15, where determining whether the campaign condition is satisfied, comprises:

determining that a quantity of bytes, allotted to the service campaign, is available for the mobile communication service, the quantity of bytes, allotted to the service campaign, being specified in the campaign condition, the campaign condition being satisfied when the quantity of bytes is available.

20. The method of claim 15, further comprising:

providing information, associated with usage, for the mobile communication service to be attributed to the dongle device and/or the mobile device, to a packet data network gateway and/or an authentication, authorization, and accounting server.

* * * * *